(12) United States Patent
Liu et al.

(10) Patent No.: US 6,546,166 B1
(45) Date of Patent: Apr. 8, 2003

(54) MULTI-STAGE OPTICAL DWDM CHANNEL GROUP INTERLEAVER

(75) Inventors: Yuqiao Liu, Sunnyvale, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 10/011,584

(22) Filed: Nov. 5, 2001

(51) Int. Cl.[7] .................................................. G02B 6/28

(52) U.S. Cl. ......................... 385/24; 385/24; 385/37; 385/16; 385/14; 385/15; 385/31; 385/42; 385/33; 385/34; 359/115; 359/124; 359/130; 359/127

(58) Field of Search ........................ 385/24, 37, 16, 385/14, 15, 31, 42, 46, 33, 34; 359/115, 124, 130, 127

(56) References Cited

U.S. PATENT DOCUMENTS 5,852,505 A  * 12/1998 Li ............................ 385/24 X
6,067,178 A  *  5/2000 Zheng ....................... 385/24 X
6,281,997 B1    8/2001 Alexander et al. .......... 359/130

* cited by examiner

Primary Examiner—Phan T. H. Palmer
(74) Attorney, Agent, or Firm—Joe Zheng; C. P. Chang

(57) ABSTRACT

An optical fiber structure for demultiplexing/multiplexing includes a coupler which splits an incoming signal with multiple channels into two substantially identical signals that are respectively processed to separate the closely located successive channel groups for further demultiplexing or multiplexing. The spectrum characteristics to process the two identical signals are so chosen that the channel distortion and/or transmission loss are minimized. In particular, multiple stages of splitter filters are used to shorten the transmission path a channel signal has to pass through. As a result, signal distortion and/or transmission loss are minimized and the channel groups are interleaved by a single channel group.

16 Claims, 5 Drawing Sheets

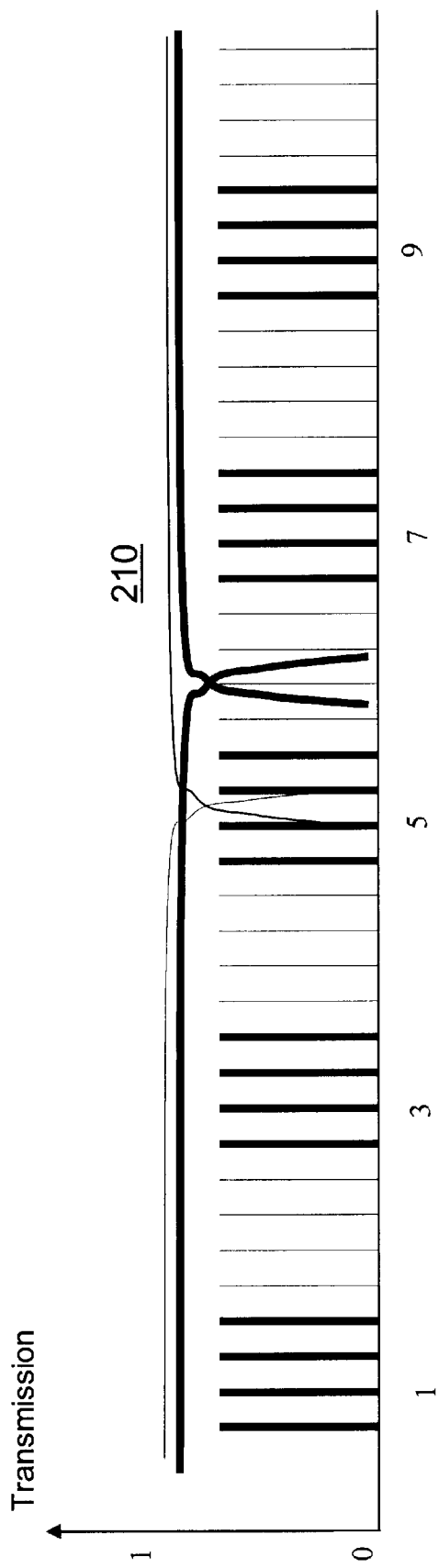

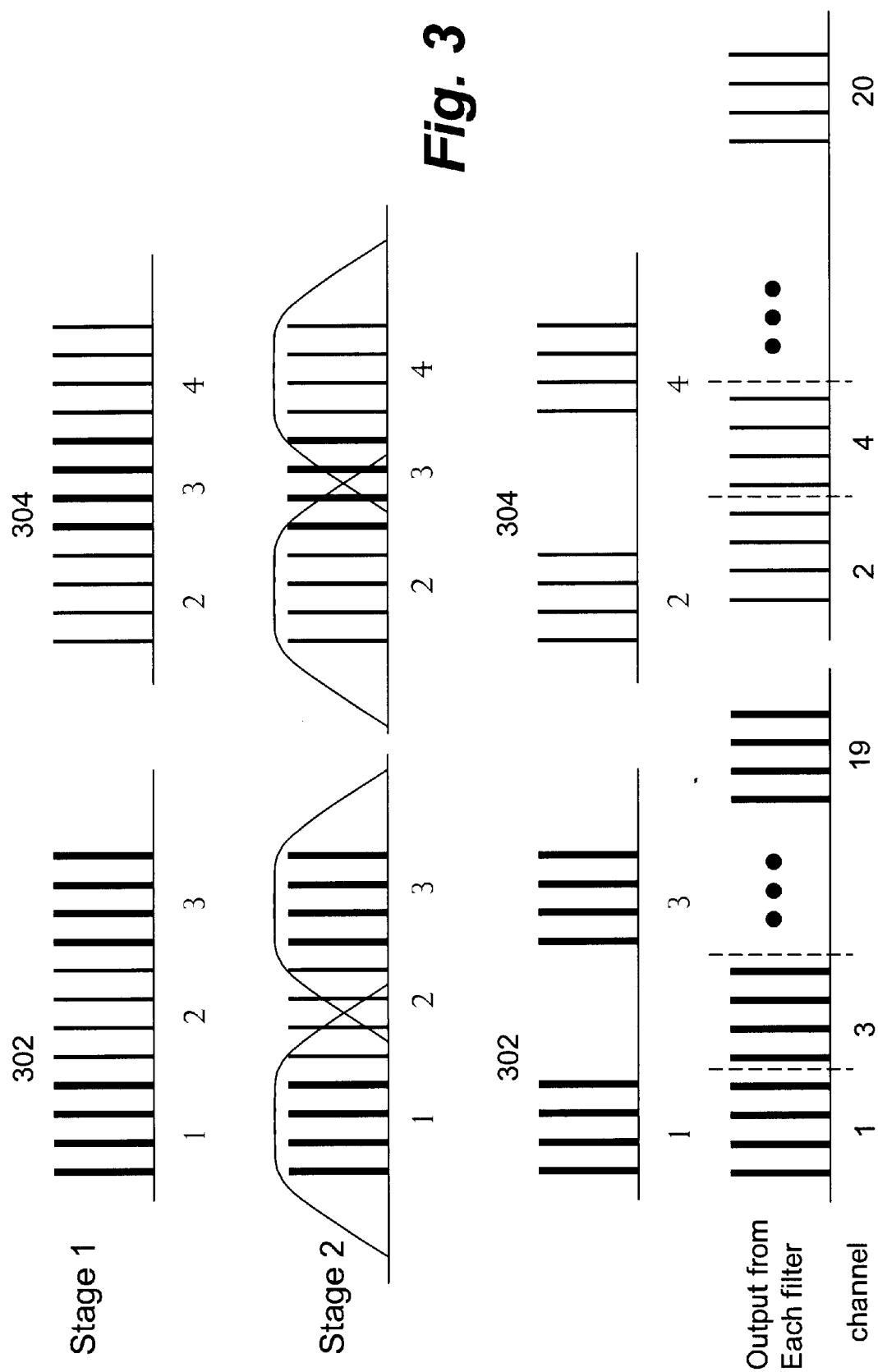

MULTI-STAGE OPTICAL DWDM CHANNEL GROUP INTERLEAVER

CROSS-REFERENCE TO RELATED APPLICATION

This application is related to U.S. application Ser. No.: 09/613,026, entitled "Optical DWDM Channel-Group Interleaver", commonly assigned, filed Jul. 6, 2000 now ABN, which is hereby incorporated by reference.

BACKGROUND OF THE INVENTION

1. Field of the Invention

The invention is generally related to the area of optical communications. In particular, the invention is related to improved designs of multi-stage optical DWDM (Dense Wavelength Division Multiplexing) channel-group interleaver to minimize signal distortion and/or transmission loss.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths in a single fiber to transmit in parallel different communication protocols and bit rates. Transmitting several channels in a single optical fiber at different wavelengths can multi-fold expand the transmission capacity of the existing optical transmission systems, and facilitating many functions in optical networking. An international standard wavelength grid has been suggested by ITU (International Telecommunication Union) for the center wavelengths of the DWDM systems. Different technologies have been developed to divide or combine channels or subgroups of channels in the ITU grid.

It should be noted that the typical DWDM thin film technology is based on cascading single channel units into multi-channel module. Thus, when the channel counts increases, accumulated maximum insertion loss of the cascade module increases proportionally. Under this situation, the total channel count in cascading structure is normally limited below a certain number (e.g. 16). As the communication networks demand ever increasing bandwidth, the channel count in the DWDM systems increases rapidly. As mentioned in the previous paragraph, many different technologies have been developed to divide channels of the original signal spectrum into subgroups, wherein the band splitters and the interleavers are two of them.

From a terminology's viewpoint, a device that multiplexes different wavelength channels or groups of channels into one fiber is a multiplexer, and a device that divides the multiplexed channels or groups of channels into individual or subgroups of channels is a demultiplexer. Specifically, when a multiplexer combines two streams of spectrum-periodic optical signals into a single, denser spectrum-periodic signal stream, or in reverse a demultiplexer separates a single spectrum-periodic signal stream into two complementary spectrum-periodic signal streams, such multiplexer/demultiplexer is called an interleaver. Understandably, the spectrum-periodic signal stream is defined in the optical frequency domain and the periodicity is limited within certain optical fiber transmission band. The main function of an interleaver is to separate a channel-continuous spectrum-periodic signal stream into coarser spectrum-periodic signal streams or vice versa. The typical standard interleaver is used to divide the signal spectrum into an even channel group including channels 2, 4, 6, 8 . . . and an odd channel group including channels 1, 3, 5, 7 . . . .

Somewhat differently, the band splitter is to divide the signal stream into subgroups by using the sequential thin film filters, for example, splitting the spectrum into the red and blue bands first and then splitting the spectrum further down via the same principle, for example, U.S. Pat. No. 6,067,178. Understandably, a reverse process of the band splitter may combine the spectrum signal groups.

Regarding the former, i.e., the interleaver, a variety of technologies have been exploited to achieve high performance thereof, including fused fiber Mach-Zander interferometer, multi-cavity Fabry-Perit interferometer, and polarization interference filters consisting of birefringent crystals. However, the interleaver technology faces poor thermal stability, poor isolation in non-adjacent channels, and no-flat pass band, thus requiring additional active thermal control and resulting in reliability and other concerns.

Regarding the latter, i.e., the band splitter, the problem is that the channels on the edge of the bands (edge channels) will suffer server distortion and thermal drift deterioration, and thus these affected edge channels typically are omitted when using a band splitter to divide the spectrum. Therefore, it is very hard to achieve a fully channel-continuous spectrum through the band splitter. The user has to either compromise this defective spectrum or compensate it with complicated expensive means. Anyhow, neither way is deemed economic or reliable. It can be appreciated that recently to maximize usage of the limited spectrum, the designated application channels are arranged very close to each other. It is very difficult to separate these closely arranged channels from one another by directly using the band splitter without incurring severe distortions of the channels located on the edges of the band.

Therefore, an object of the invention is to provide a device/system which can easily, economically, reliably and precisely separate the desired channels from the multiple channels under a condition that there are no longer the defective distorted channels thereof and the fully channel-continuous spectrum is achieved.

SUMMARY OF THE INVENTION

The present invention pertains to improved designs of optical DWDM channel group interleavers that use a number of layers or stages of grouped splitter filters, hence referred to as multi-stage optical DWDM channel group interleavers. According to one aspect of the present invention, an optical fiber structure for demultiplexing/multiplexing includes a coupler that splits an incoming signal with multiple channels into two substantially identical signals that are respectively and mutually exclusively processed to separate the closely located successive channels into odd and even channel subgroups for further demultiplexing or multiplexing. The spectrum characteristics to process the two identical signals are so designed that the channel distortion and transmission/insertion loss are minimized by distorting only odd or even channel groups respectively in the two substantially identical signals. In particular, multiple stages of splitter filters are used to shorten the transmission path a channel group signal has to pass through. As a result, signal distortion and transmission/insertion loss are minimized.

According to one embodiment, channel groups in an incoming optical signal are separated in a cluster fashion.

Namely, each cluster includes a predetermined number of channel groups and the clusters are separated or interleaved by at least one channel group. This is achieved through an arrangement of one or more filters, the frequency response of the arrangement is so designed that the passband thereof is extended to the neighboring channels to ensure that the channels to be "through" are intact. Through repeated channel separation processes, the originally multiplexed odd and even channel groups are demultiplexed.

One of the objects in the present invention is to minimize the distortion and transmission/insertion loss incurring in guiding the optical signal through optical filters.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2C shows another set of exemplary transmission frequency responses that may be used in an embodiment;

FIG. 3 shows a corresponding frequency or wavelength diagrams to demonstrate how the interleaver in FIG. 1 operates and should be understood in conjunction with FIG. 1.

DETAILED DESCRIPTION OF THE PREFERRED EMBODIMENT

The present invention pertains to improved designs of optical DWDM channel group interleavers that use a number of layers or bands of grouped splitter filters, hence referred to as multi-stage optical DWDM channel group interleavers. One of the features in the present invention is first to divide an incoming signal carrying closely located successive DWDM channels multiplexed therein into two substantially identical signals that are then respectively and mutual-exclusively processed to separate the closely located successive DWDM channels into channel subgroups for further demultiplexing or multiplexing. The spectrum characteristics to process the two identical signals are so chosen that the channel distortion and/or transmission loss are minimized. As a result, a continuous signal spectrum can be divided into smaller groups to be further processed by standard thin film filter DWDM technology, resulting in low cost, high performance and high reliability of DWDM channel group interleavers.

The detailed description of the present invention is presented largely in terms of procedures, steps, logic blocks, processing, or other symbolic representations that directly or indirectly resemble the operations of optical devices or systems coupled to optical networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
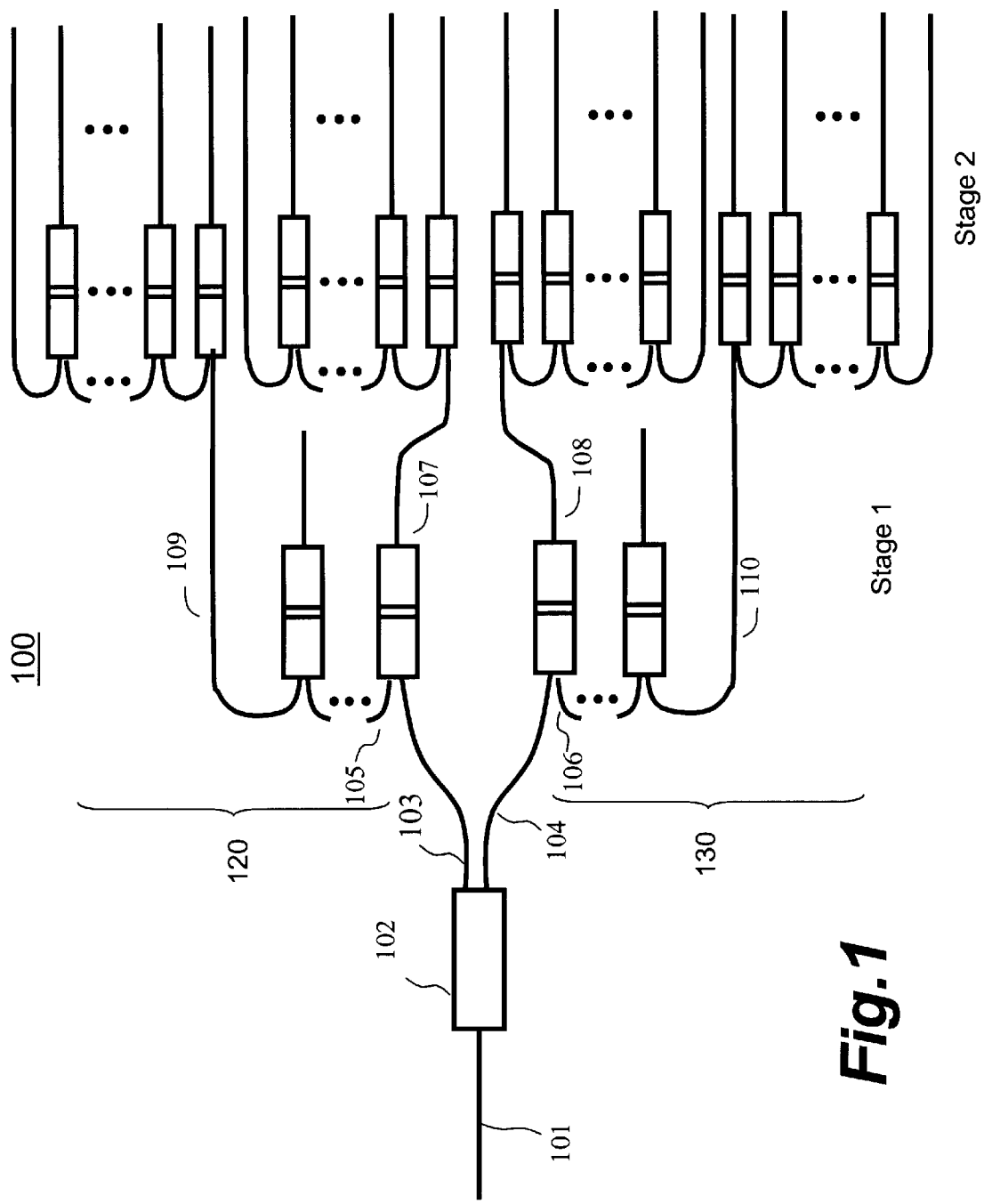
FIG. 1 shows a configuration of a multi-stage optical DWDM channel-group interleaver according to one embodiment of the present invention.

Referring now to the drawings, in which like numerals refer to like parts throughout the several views. FIG. 1 shows a configuration of a multistage optical DWDM channel-group interleaver 100 according to one embodiment of the present invention. The optical DWDM channel-group interleaver system/device 100 includes a fiber optical coupler 102 with an input fiber optical pigtail port 101 and two output port/branches 103, and 104. In one embodiment, the light coupled in from port 101 is a multiplexed eighty-channel DWDM signal, located and numbered according to ITU suggestions at 100GHz spacing. In other words, the incoming multiplexed DWDM signal from the port 101 is categorized with successive channel groups as follows: group 1 (channels 1–4), group 2 (channels 5–8), group 3 (channels 9–12), group 4 (channels 13–16), group 5 (channel 17–20), group 6 (channels 21–24), group 7 (channels 25–28), group 8 (channels 29–32), group 9 (channels 33–36), group 10 (channel 37–40), group 11 (channel 41–44), group 12 (channel 45–48), group 13 (channel 49–52), group 14 (channel 53–56), group 15 (channel 57–60), group 16 (channel 61–64), group 17 (channel 65–68), group 18 (channel 69–72), group 19 (channel 73–76), and group 20 (channel 77–80).

To facilitate the description of the present invention, the incoming multiplexed signal includes 80 channels or wavelengths successively and closely located over a spectrum band. The 80 channels are virtually grouped into 20 channel groups, successively labeled as group 1, 2, . . . 20. Each of the channel groups includes at least 2 channels while 4 channels are used herein and can be either an odd or even numbered channel group. As shown in the figure, the incoming signal is split by the coupler 102 into two substantially identical signals in the branches 103 and 104 having the same spectrum with less power than the original one.

The split signals from the coupler 102 are respectively coupled to a first group of splitter filters 120 and a second group of splitter filters 130, both of the first group and the second group of splitter filters 120 and 130 are in a first layer or stage of splitter filters (e.g. Stage 1). As used herein, unless otherwise stated, a splitter filter is an optical filter whose frequency response demonstrates filtering characteristics substantially close to a bandpass filter that allows signals (or channels) between two specific frequencies to pass, but that discriminates against signals at other frequencies. One exemplary splitter filter that may be used in FIG. 1 can be obtained from Alliance Fiber Optic Products, Inc. (www.afop.com), part name: Filter WDM Band Splitter.

Figure 2A:
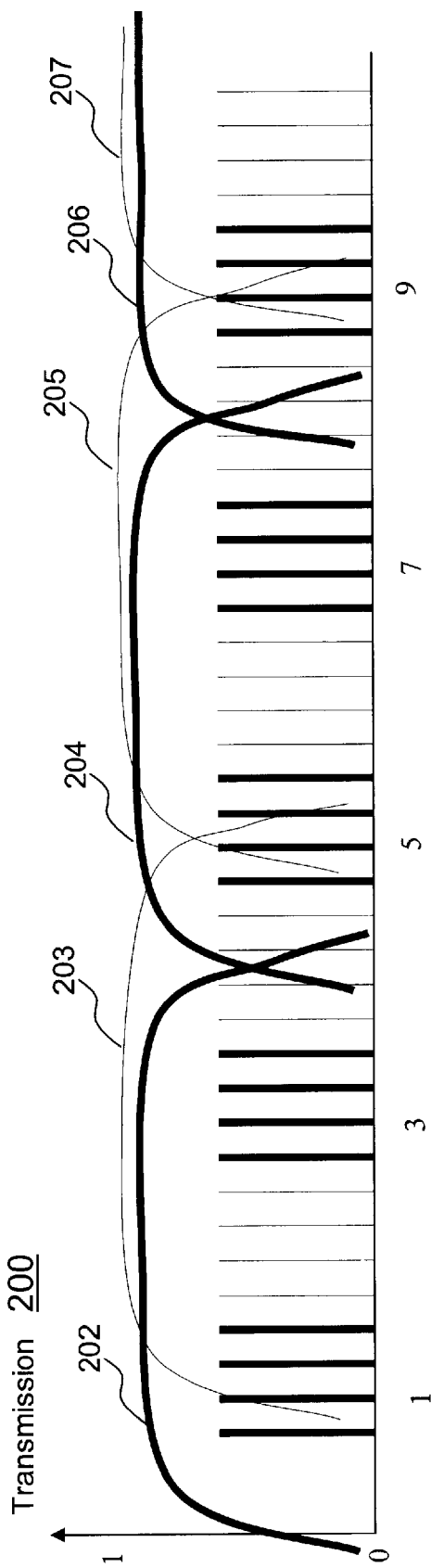
FIG. 2A shows exemplary transmission frequency responses used to facilitate the description of the present invention according to one embodiment thereof.
Figure 2B:
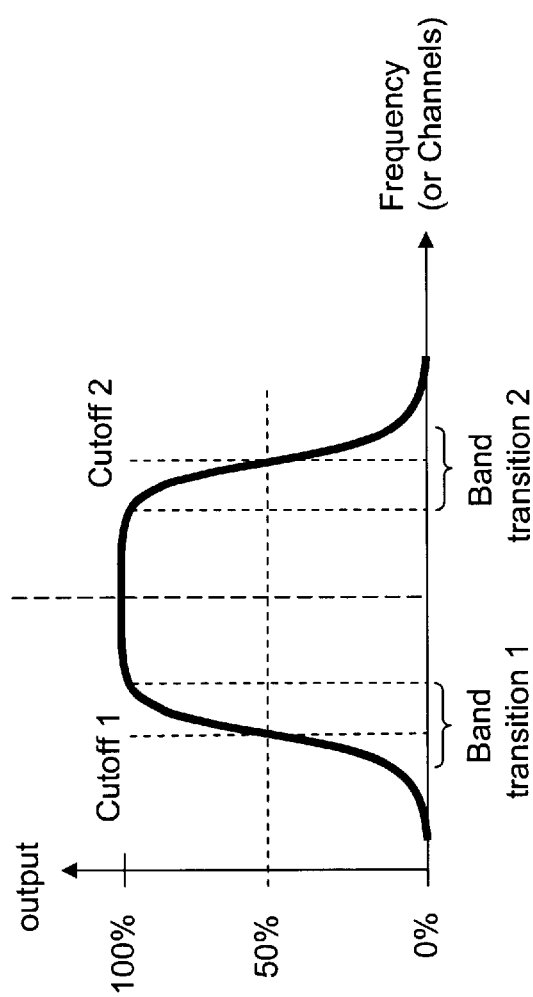
FIG. 2B illustrates a frequency response of a bandpass filter.

According to one embodiment with 80 channels in an incoming signal, each of the two filters groups includes 20 subgroups of splitter filters, each of the subgroups has a bandpass spectrum. FIG. 2A shows corresponding exemplary transmission frequency responses 200. In particular, frequency response spectrums, or simply curves, 202, 204 and 206 represent the spectrum for the subgroup and curves 203, 205 and 207 represent the subgroups in the other one of the two groups. It is well understood in the art that the frequency characteristics (e.g. a spectrum response) of a splitter filter or a group of filters could be hardly implemented as desired. In particular, a desired bandpass filter will have a band spectrum response with cutoff frequencies being unclearly distinct, resulting in two band transitions as shown in FIG. 2B. As a result, signals falling in the transitions or the channels adjacent to the cutoff frequencies can be severely distorted in addition to other undesirable effects. To prevent such distortion and other concerns to the channels allowed to pass due to the undesirable spectrum effects, the spectrum curve of a splitter filter or a group of splitter filters is extended to a neighboring channel group. In other words, the two band transitions are falling onto two neighboring channel groups. For example, the curve 204 transmits a channel group cluster (i.e. a group of channel groups) or channel groups 5, 6 and 7 while the curve edges (i.e. the transitions) fall onto the neighboring channel groups 4 and 8. As such, channel groups 5, 6 and 7 are ensured intact.

In operation, the two identical signals from the branches 103 and 104 are respectively coupled to the first group of splitter filters 120 and the second group of splitter filters 130. According to one embodiment, five splitter filters in each subgroup have respective frequency responses illustrated in FIG. 2A. Accordingly, in the signal transmitted via the branch 103, the channel groups 1, 2, 3 are dropped out by the splitter filter 107 and transmitted to a splitter filter in the next stage. The remaining signal is reflected out of the splitter filter 107 through the output port 105 and goes into a next splitter filter in the subgroup to get the channel groups 5, 6, 7 dropped out thereof and transmitted to a splitter filter in the next stage. The remaining signal travels in the same fashion through the other splitter filters in the subgroup and subsequently out from 109 to the next stage. The similar operation happens in the signal transmitted via the branch 104. In the signal transmitted via the branch 104, the channel groups 2, 3, 4 are dropped out by the splitter filter 108 and transmitted to a splitter filter in the next stage. The remaining signal is reflected out of the splitter filter 108 through the output port 106 and goes into a next splitter filter in the subgroup to get the channel groups 6, 7, 8 dropped out thereof and transmitted to a splitter filter in the next stage. The remaining signal travels in the same fashion through the other splitter filters in the subgroup and subsequently out from 110 to the next stage.

As a result, channel groups (1, 2, 3), (5, 6, 7), (9, 10, 11), (13, 14, 15) and (17, 18, 19) in the first group of splitter filters 120 are cleanly out for use in the first group of splitter filters 120 while channel groups 4, 8, 12, 16 and 20 suffer large distortion and are not used. Similarly, channel groups (2, 3, 4), (6, 7, 8), (10, 11, 12), (14, 15, 16) and (18, 19, 20) in the second group of splitter filters 130 are cleanly out for use in the second group of splitter filters 130 while channel groups 1, 5, 9, 13 and 17 suffer large distortion and are not used. Without the loss of generality, it is noted that the channel group that is severally distorted and separates two channel group clusters in the first group of splitter filters 120 is even numbered. Likewise, the channel group that is severally distorted and separates two channel group clusters in the second group of splitter filters 120 is odd numbered. As will be noted below, the channel group that further separates channel groups in a cluster will remain the same characteristics. In other words, if a channel group separates the channel group clusters is an odd or even channel group, it will be an odd or even channel group that further separates channels groups in a channel group cluster.

It should be noted that the channel grouping as well as the bandwidth of the spectrum curves as described above are not limitations to the present invention. Depending on an exact implementation, the channels can be grouped differently and the spectrum curves can be configured accordingly. FIG. 2C shows another design of the frequency response of the splitter filters that may be used in this stage of the group splitter filters. Response curve 210 shows that at most 5 channels may be transmitted through a splitter filter or a group of splitter filters. A different configuration will result in a different design of an interleaver contemplated in the present invention, additional descriptions of the design will be provided below.

Referring now to FIG. 3, there are shown spectrums or frequency responses at each stage of the splitter filters. FIG. 3 shall be understood in conjunction with FIG. 1 and FIG. 2A. Stage 1 shows two exemplary transmitted outputs 302 and 304 from a splitter filter in each of the two groups in Stage 1. The filtered outputs are then respectively coupled to splitter filters in Stage 2 in which the splitter filters are grouped in smaller subgroups. To follow the examples in FIG. 1 and FIG. 2A, each subgroup in this stage contains two splitter filters. The frequency response of the subgroup is so arranged that only the first and the third channel groups are dropped out cleanly or transmitted through. In other words, the frequency response curves, similar to those in Stage 1, extend the transitions into neighboring channels to ensure that the desired channels are not distorted. In view of the signal 302 (an output from Stage 1), the channel group 1 is dropped out from the splitter filter in the subgroup and transmitted to a splitter filter in the next stage. The remaining signal is reflected out of the splitter filter through the output port thereof and into a next splitter filter in the subgroup, and further gets the channel group 3 dropped out thereof and transmitted to a splitter filter in the next stage. Regarding the coupled input 304, splitter filters with similar frequency responses (but at different wavelengths) are used to output channel groups 2 and 4. Understandably, as a result of the processing in Stage 2, all odd channel groups are separated from one of the two identical signals from the coupler 102 and all even channel groups are separated from the other one of the two identical signals from the coupler 102. The spectrum 350 illustrates the resultant channels.

It can be observed that, in the signal transmitted via the branch 103, the channels of the even groups suffer large distortion and are not used while those of the odd groups are cleanly dropped out for use without significant distortion. In opposite, in the signal transmitted via the branch 104, the channels of the odd groups suffer large distortion and are not used while those of the even groups are cleanly dropped out for use without significant distortion. Therefore, the cleanly dropped channels of the odd groups and of the even groups in the branches 103 and 104 substantially compensate/complement each other to obtain a complete and channel-continuous (without missing channels) signal spectrum.

One of the features of having multiple stages of splitter filters is to minimize the signal distortion and transmission/insertion loss. With the present invention, it is now possible to control such distortion and transmission/insertion loss to a tolerable level, essentially independent of the number of channels a signal may carry therein.

It is noted that a splitter filter or a group of splitter filters have been used in the above examples. It can be appreciated by those skilled in the art that a splitter filter does not necessarily indicate that it is a single filter. From the description herein, it can be appreciated that a splitter filter may be implemented with one or more optical filters to achieve a desired frequency response thereof. In the following description of designing a general interleaver contemplated in the present invention, unless it is specifically stated, a filter herein indicates one or more filters implemented to achieve a desired frequency response curve. According to one embodiment, a frequency response of a filter is substantially close to a band-pass filter with its pass wavelengths falling on the channels to be "through" and its transitions falling in the neighboring channels to ensure that the "through" channels are transmitted through without distortion.

Figure 4:
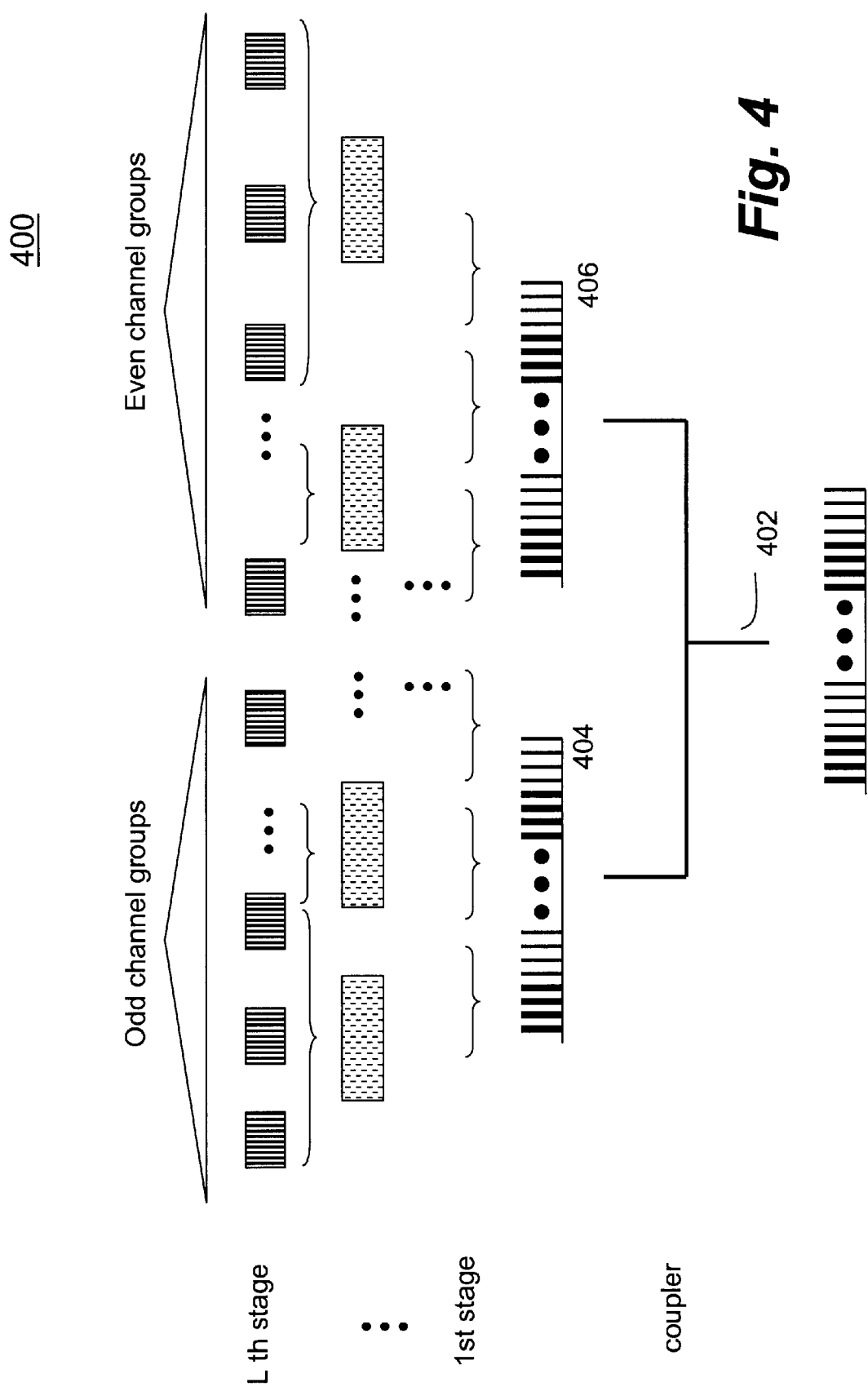
FIG. 4 shows one possible general design of a multi-stage optical DWDM channel-group interleaver according to one embodiment of the present invention.

FIG. 4 shows a general design 400 according to one embodiment of the present invention. It is assumed that an incoming multiplexed signal 402 includes N channels. After the signal 402 goes through a coupler or an optical splitting device, two substantially identical signals 404 and 406 are produced and respectively processed by subsequent groups of filters. The frequency responses for subsequent groups of filters are largely dependent on specified distortion and transmission/insertion tolerance. As understood from the description above, filters in a group are successively coupled to each other. The number of filters in a group determines the distortion and transmission/insertion loss. Typically, the more filters in a group, the more filters a light signal has to pass through and the more distortion and transmission/insertion loss could be introduced. With the employment of the present invention, it is possible to design a limited number (L) of stages of filters, wherein each stage has a number (K) of groups, each group has one or more filters (X) (i.e. alternatively X channel groups). Although various structures are possible, an appropriate arrangement of L, K and X can lead to an optical DWDM channel group interleaver with the least distortion and transmission/insertion loss.

Subsequently, the odd and even numbered channel groups are separated in the Lth Stage, where L is an integer ($\geq 1$). As shown in FIG. 4, as a result of the repeated separation processes in the $1^{st}$, $2^{nd}$ and (L−1)th Stage, the channel groups multiplexed in a composite signal 402 are now separated with all the even numbered channels in one cluster and all the odd numbered channels in another cluster.

Accordingly, in (L−1)th Stage, the channel groups shall be alternately present, namely, every other channel groups are to be "through" in the Lth Stage. This requires that a frequency response for each of the group filters is so designed that there is one channel group no to be used between every two channel groups to be transmitted to the Lth stage. For example, there are two resultant channel groups (1, 2, 3, 4, 5) and (7, 8, 9, 10, 11), in which channel group 6 is discriminated by both of the filter groups for channel groups (1, 2, 3, 4, 5) and (7, 8, 9, 10, 11). In other words, the one sides of the transitions of both frequency responses for the two filter groups fall into the channel group 6 to ensure that channel groups 1, 2, 3, 4, 5, 7, 8, 9, 10, 11 are intact. The same design logic may be applied to the designs in other stages (e.g. (L−2)th).

According to another embodiment, the number of the splitter filters in a group may be changed depending on the stage level. For example, the number of the splitter filters in a group at (L−2)th level is smaller than that at (L−1)th level, and the number of the splitter filters in a group at (L−1)th level is smaller than that at Lth level. This design may be extended to ensure that the maximum number of filters a channel signal may eventually pass through is controlled in accordance with predefined signal distortion and transmission/insertion loss.

According to one embodiment, an incoming composite light signal 402 includes a total of N channel. It is assumed that each reflection has an insertion loss of reflection ILR while each transmission has an insertion loss of transmission ILT and ILT>ILR. After the coupler, the signal 402 is divided into two substantially identically signals 404 and 406. Each of the two signals 404 and 406, as described above, are respectively processed in two separate branches comprising multiple stages of filters. It is assumed that there are M1 subgroups in each branch at the first stage; each of the M1 subgroups is further divided into M2 subgroups at the second stage, . . . and so on to the last ML subgroups at the Lth stage that has X channel groups in each subgroup.

The maximum insertion loss of any channel group in this configuration will be $LOSS_{max}$=ILR*(M1−2)*(M2−2)*, . . . , (ML−2)*(X−1)+coupler loss+ILT*(L+1), and N is equal to or approximately close to 2*M1*M2* . . . ML*X. To optimize $LOSS_{max}$ for given ILT, ILR and N, one can find a set of M1, M2, . . . ML and X such that $LOSS_{max}$ reaches a minimum. In the case in which ILT<ILR, the expression of $LOSS_{max}$ may be updated to ILR*(M1−1)*(M2−1) *, . . . , (ML−1)*(X−1)+coupler loss+ILT. The optimization can be achieved, for given ILT, ILR and N, by finding a set of M1, M2, . . . ML and X to minimize the $LOSS_{max}$. M1, M2, . . . ML and X should be integer.

The above shows an exemplary design of a multi-stage optical DWDM channel group interleaver from the perspective of the minimum distortion and transmission/insertion loss. Given the description herein, those skilled in the art can derive alternative approaches to achieve a multi-stage optical DWDM channel group interleaver that has the minimum distortion and transmission/insertion loss.

It can be appreciated by those skilled in the art that the system or device and the way disclosed above can work as a demultiplexer, while through a reverse procedure, the above structure can also work as a multiplexer. In addition, it can be appreciated that the invention essentially uses a novel compound/complex method to demultiplex groups of channels with a channel-continuous signal spectrum while without the disadvantages of the conventional interleavers and band splitters. Some of the features and/or advantages of the invention are as follows:

(1) The current invention is based on the thin film filter technology and thus can be extremely reliable in long-term operation and requires no additional active thermal control;

(2) The current invention uses a conventional power coupler to substantially equally separate the signal into two branches. Thus the distortion and thermal deterioration of the edge channels in the conventional band splitter technology can be avoided;

(3) Multiple-stage groups of splitter filters are used to shorten the transmission path a channel signal has to pass through, essentially minimizing the transmission loss to a minimum;

(4) As the DWDM channel group interleaver divides the total usable spectrum into sequential independent subgroups, the mutiplexing or demultiplexing of a great number of signal channels or groups can be achieved with low cost, high performance and high reliability.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the coupler may be replaced by the similar device that can duplicate the input signal to provide two same signals on its two output ports. Additionally, the number of the groups or the channel number in each group in both branches 103 and 104 may not be equal to each other for flexibly configuring the demultiplexed channels. Accordingly, the scope of the present invention is defined by the appended claims rather than the forgoing description of embodiments.

We claim:

1. A fiber optical device comprising:

an optical splitting device receiving a multiplexed signal carrying channel groups numbered odd or even, each including a number of individual channels and the splitting device outputting two substantially identical signals of the multiplexed signal;

a first stage of filters configured to be first and second subgroups of the filters, each of the subgroups of the filters coupled to the splitting device and receiving one of the two identical signals, wherein respective frequency responses of the first and second subgroups are so designed that eventually the even numbered channel groups are respectively separated from the odd numbered channel groups; and a second stage of filters configured to be a number of subgroups of the filters, each of the subgroups in the second stage coupled to one of the filters in the first stage and independently outputting one of the channel groups.

2. The fiber optical device of claim 1, wherein the respective frequency responses for the first subgroups and the second subgroups in the first stage are so arranged that each of the filters therein outputs a number of the channel groups, wherein the output channel groups are respectively separated by one of the channel groups.

3. The fiber optical device of claim 2, wherein each of the respective frequency responses has a cut-off frequency transition falling into the one of the channel groups that separates the output channel groups so that the output channel groups are not distorted.

4. The fiber optical device of claim 3, wherein each of the filters in the second stage has a band filtering frequency response that drops out all except for one of the output channel groups.

5. The fiber optical device of claim 4, wherein the band filtering frequency response is so designed that the one of the output channel groups that is not dropped out is not distorted at all.

6. The fiber optical device of claim 1, wherein the filters of the first subgroup in the first stage are successively coupled to each other and the filters of the second subgroup in the first stage are successively coupled to each other.

7. The fiber optical device of claim 1, wherein the optical splitting device is a coupler.

8. A fiber optical device comprising:

a coupler receiving a multiplexed signal including channel groups numbered even or odd, and the coupler outputting two identical signals of the multiplexed signal; and two groups of filters, each receiving one of the two identical signals, each of the two groups including at least two stages of filters, the filters in each of the stages being configured in subgroups, the filters in each of the subgroups being successively coupled to each other, wherein a frequency response for each of the subgroups in either one of the two groups is so designed that, in one of the two identical signals, all of the odd numbered channels groups are subsequently separated from the even numbered channels, in another one of the two identical signals, all of the even numbered channels groups are subsequently separated from the odd numbered channels.

9. The fiber optical device of claim 8, wherein the respective frequency response for each of the subgroups in either one of the two groups has band pass characteristics to allow a portion of the channel groups received at the each of the subgroups to pass through while reflecting the rest of the channel groups received to an adjacent subgroup in the subgroups at one of the at least two stages.

10. The fiber optical device of claim 9, wherein the respective frequency response for each of the subgroups in either one of the two groups has transitions falling into two neighboring channel groups so that the portion of the channel groups passing through the each of the subgroups are not distorted.

11. A method for demultiplexing/multiplexing a composite signal including multiple channel groups numbered even or odd, the method comprising:

generating two identical signals from the composite signal;

coupling respectively the identical signals to a first stage of filters configured to be first and second groups of the filters, each of the groups of the filters receiving one of the two identical signals and outputting a number of channel group clusters, each of the channel group clusters including an odd number of the channel groups and every two of the channel group clusters being separated by one of the channel groups;

coupling the channel group clusters to subsequent stages of filters to further separating the channel group till the channel groups in each of the channel group clusters is interleaved by one of the channel groups in the each of the channel group clusters; and wherein the one of the channel groups that separates the two of the channel group clusters and the one of the channel groups in the each of the channel group clusters that interleaves the channel groups in the each of the channel group clusters are an either odd or even numbered channel group.

12. The method of claim 11, wherein a frequency response of either the first and second groups of the filters is so designed that the channel group clusters are transmitted through without being distorted while two neighboring single channel groups are severally distorted.

13. The method of claim 11, wherein each of the two neighboring single channel groups that are severally distorted is the one of the channel groups separating every two of the channel group clusters.

14. The method of claim 11, wherein each of the subsequent stages of filters has a number of filters, and wherein the number of filters and the subsequent stages of filters are so designed that each of the channel groups travels at least number of the filters so that a distortion and transmission/insertion loss of the each of the channel groups is minimized.

15. A method for demultiplexing/multiplexing a composite signal including multiple channel groups numbered even or odd, the method comprising:

determining a transmission/insertion loss C for a coupler that is to separate the composite signal into two substantially identical signals, each respectively processed in two separate branches comprising multiple stages of filters;

determining from the filters that each reflection has an insertion loss of reflection ILR while each transmission has an insertion loss of transmission ILT;

minimizing a valuation of $LOSS_{max}$, wherein $LOSS_{max}$= ILR*(M1−2)*(M2−2)*, ..., (ML−2)*(X−1)+C+ILT*(L+1), if ILT≧ILR; or $LOSS_{max}$=ILR*(M1−1)*(M2−1)*, ..., (ML−1)*(X−1)+C+ILT, if ILT<ILR; and wherein N is a total number of individual channels in the composite signal and equal to or approximately close to 2*M1*M2* ... ML*X, and wherein there are M1 subgroups in each branch at a first stage, each of the M1 subgroups is further divided into M2 subgroups at the second stage, and till to last ML subgroups at the Lth stage that has X channel groups.

16. The method of claim 15 further comprising outputting from the last ML subgroups even channel groups in one channel group cluster and odd channel groups in another channel group cluster.

* * * * *